(12) United States Patent
Toval et al.

(10) Patent No.: US 12,333,674 B2
(45) Date of Patent: *Jun. 17, 2025

(54) SYSTEM AND A METHOD FOR SURVEYING GRAPHICAL OBJECTS ON A SCREEN DISPLAY

(71) Applicant: BI SCIENCE (2009) LTD, Tel-Aviv (IL)

(72) Inventors: Assaf Toval, Herzeliya (IL); Kfir Moyal, Tel-Aviv (IL)

(73) Assignee: BI SCIENCE (2009) LTD, Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,641

(22) Filed: Feb. 27, 2023

(65) Prior Publication Data

US 2023/0281753 A1     Sep. 7, 2023

Related U.S. Application Data

(63) Continuation of application No. 17/674,774, filed on Feb. 17, 2022, now Pat. No. 11,620,731.
(Continued)

(51) Int. Cl.
*G06T 3/4038* (2024.01)
*G06F 16/583* (2019.01)
(Continued)

(52) U.S. Cl.
CPC .......... *G06T 3/4038* (2013.01); *G06F 16/583* (2019.01); *G06F 16/786* (2019.01);
(Continued)

(58) Field of Classification Search
CPC ... G06T 3/4038; G06F 16/583; G06F 16/786; G06F 16/951; G06Q 30/0241; H04N 21/25866
See application file for complete search history.

(56) References Cited

U.S. PATENT DOCUMENTS

2010/0138775 A1* 6/2010 Kohen ................. G06F 11/3041
715/781
2011/0148628 A1* 6/2011 Goto ................... G06Q 30/0241
340/540
(Continued)

*Primary Examiner* — Sunghyoun Park
(74) *Attorney, Agent, or Firm* — Smith Tempel Blaha LLC; Gregory Scott Smith

(57) ABSTRACT

A method, a computer program, or a computerized system for monitoring graphical content of a screen display by the actions of receiving, by a first software program executed by a processor of a computerized device communicatively coupled to a first server via a communication network, at least one parameter characterizing a graphical object; monitoring a stream of data received by a second software program executed by the processor of the computerized device communicatively coupled to a second server via the communication network, to capture the at least one parameter characterizing a graphical object; monitoring a stream of data between the second software program and a screen display of the computerized device to capture at least one graphical object associated with the at least one parameter characterizing the graphical object; and capturing the graphical object.

10 Claims, 5 Drawing Sheets

Related U.S. Application Data

(60) Provisional application No. 63/160,814, filed on Mar. 14, 2021.

(51) Int. Cl.
*G06F 16/783* (2019.01)
*G06F 16/951* (2019.01)
*G06Q 30/0241* (2023.01)
*H04N 21/258* (2011.01)

(52) U.S. Cl.
CPC ....... *G06F 16/951* (2019.01); *G06Q 30/0241* (2013.01); *H04N 21/25866* (2013.01)

(56) References Cited

U.S. PATENT DOCUMENTS

| | | | |
|---|---|---|---|
| 2012/0243739 A1* | 9/2012 | Fukuchi | G06F 16/583 382/103 |
| 2016/0182969 A1* | 6/2016 | Berry, III | H04N 21/2187 725/36 |
| 2019/0073562 A1* | 3/2019 | Stolikj | G06F 18/24143 |
| 2019/0171884 A1* | 6/2019 | Bagheri | G06Q 30/0241 |
| 2020/0125600 A1* | 4/2020 | Jo | G06F 16/784 |
| 2022/0292634 A1 | 9/2022 | Toval et al. | |

\* cited by examiner

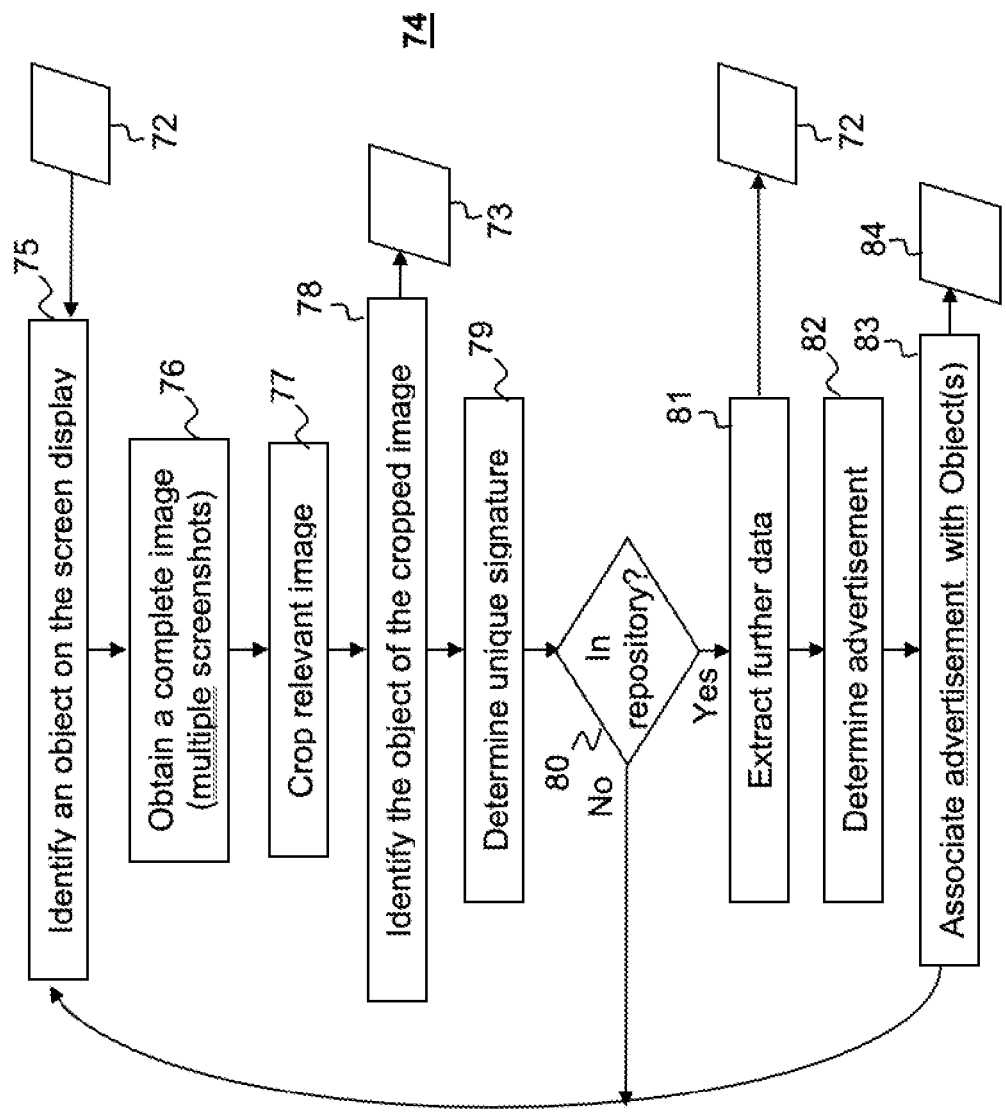

SYSTEM AND A METHOD FOR SURVEYING GRAPHICAL OBJECTS ON A SCREEN DISPLAY

FIELD

The method and apparatus disclosed herein are related to surveying user interaction with computer generated content, and, more particularly but not exclusively, to surveying graphical objects presented to the user on a screen display of a computerized device, and, more particularly but not exclusively, to automatically detect, collect, and analyze graphical objects presented to the user on a screen display of a computerized device.

BACKGROUND

Much research is done analyzing the experience a user may have when surfing the world wide web. The raw data for the research may be known as clickstream data or clickpath data. Various software programs such as browsers, as well as websites, may collect clickstream data.

In this respect, clickstream data may include all the data that is provided to a user of a computerized device via any of the outputs of the device, as well as all the data that is collected from the user of a computerized device via any of the inputs of the device. Data, or content, provided to the user may include visual data presented to the user on a screen display of the computerized device. Such visual data may include graphical objects of various types.

However, software programs collecting clickstream data concentrate on collecting alphanumeric data in the communication stream, rather than the actual content as perceived by the user. There is thus a widely recognized need for, and it would be highly advantageous to have, a method and a system for surveying graphical objects on a screen display, to devoid of the above limitations.

SUMMARY

According to one exemplary embodiment there is provided a method, and/or a computer program, and/or a computerized system executing the method, and/or the computer program, for monitoring graphical content of a screen display. The method, computer program, and/or system typically includes the actions, or processes, of receiving, by a first software program executed by a processor of a computerized device communicatively coupled to a first server via a communication network, at least one parameter characterizing a graphical object; monitoring a stream of data received by a second software program executed by the processor of the computerized device communicatively coupled to a second server via the communication network, to capture the at least one parameter characterizing a graphical object; monitoring a stream of data between the second software program and a screen display of the computerized device to capture at least one graphical object associated with the captured at least one parameter characterizing the graphical object; and capturing the graphical object.

According to another exemplary embodiment, the method, program, or system may additionally include an action or process for communicating the captured graphical object to a server via the communication network.

According to still another exemplary embodiment, the method, program, or system may additionally include an action or a process for collecting parameters associated with the captured graphical object the parameters including at least one of: temporal parameters associated with the capturing of the captured graphical object; spatial parameters associated with the captured graphical object; and parameters including parameters mode of display associated with the captured graphical object; and an action or a process for communicating the collected parameters to a server via the communication network.

According to still another exemplary embodiment, the method, program, or system may additionally include an action or a process for determining the least one graphical object to capture to be at least one of motion graphics and motion image; determining at least one of number of samples, rate of sampling, and period of sampling for capturing the graphical object; and repeating the capturing the graphical object according to the at least one of number of samples, rate of sampling, and period of sampling for capturing the graphical object.

According to still another exemplary embodiment, the parameter characterizing a graphical object may be associated with a part of the graphical object, and the method, program, or system may additionally include actions or processes for collecting a plurality of screen shots of the display screen; and arranging the plurality of screen-shots to create a panoramic view of the display screen, where the panoramic view may include two or more screen-shots, and where the two or more screen-shots includes a recognizable graphical object.

Further according to another exemplary embodiment, the recognizable graphical object may include two or more parts of the recognizable graphical object, where each of the parts of the recognizable graphical object may include one or more parameters characterizing the respective part of the recognizable graphical object.

Still further according to another exemplary embodiment the parameter characterizing a graphical object may be received, and/or monitored, and/or determined, according to one or more characteristic of a content item, which may include the stream of data.

Yet further, according to another exemplary embodiment, the method, program, or system for monitoring graphical content of a screen display may include the following actions and/or processes:

Receiving, by a software program executed by a processor of a computerized device communicatively coupled to a communication network, one or more parameters characterizing a graphical object.

Monitoring a display of the computerized device, where the processor of the computerized device receives at least one advertisement via the communication network, where the processor displays the at least one advertisement on a display screen of the computerized device, where the monitoring uses the software program executed by the processor of the computerized device.

Recognizing the one or more graphical objects being displayed on the display screen. And collecting the graphical object as displayed on the display screen, and at least one parameter associated with the display screen, and/or another content displayed on the display screen substantially concurrently.

Unless otherwise defined, all technical and scientific terms used herein have the same meaning as commonly understood by one of ordinary skill in the relevant art. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

Implementation of the method and system of embodiments disclosed below involves performing or completing certain selected tasks or steps manually, automatically, or any combination thereof. Moreover, according to actual instrumentation and equipment of preferred embodiments of the method and system presented herein several selected steps could be implemented by hardware or by software on any operating system of any firmware or any combination thereof. For example, as hardware, selected steps could be implemented as a chip or a circuit. As software, selected steps could be implemented as a plurality of software instructions being executed by a computer using any suitable operating system. In any case, selected steps of the method and system disclosed herein could be described as being performed by a data processor, such as a computing platform for executing a plurality of instructions.

BRIEF DESCRIPTION OF THE DRAWINGS

Various embodiments are described herein, by way of example only, with reference to the accompanying drawings. With specific reference now to the drawings in detail, it is stressed that the particulars shown are by way of example and for purposes of illustrative discussion of the preferred embodiments only, and are presented in order to provide what is believed to be the most useful and readily understood description of the principles and conceptual aspects of the embodiment. In this regard, no attempt is made to show structural details of the embodiments in more detail than is necessary for a fundamental understanding of the subject matter, the description taken with the drawings making apparent to those skilled in the art how the several forms and structures may be embodied in practice.

In the drawings:

FIG. 5 is a simplified block diagram of a general process for surveying graphical objects on a screen display.

DESCRIPTION OF EMBODIMENTS

Figure 1:
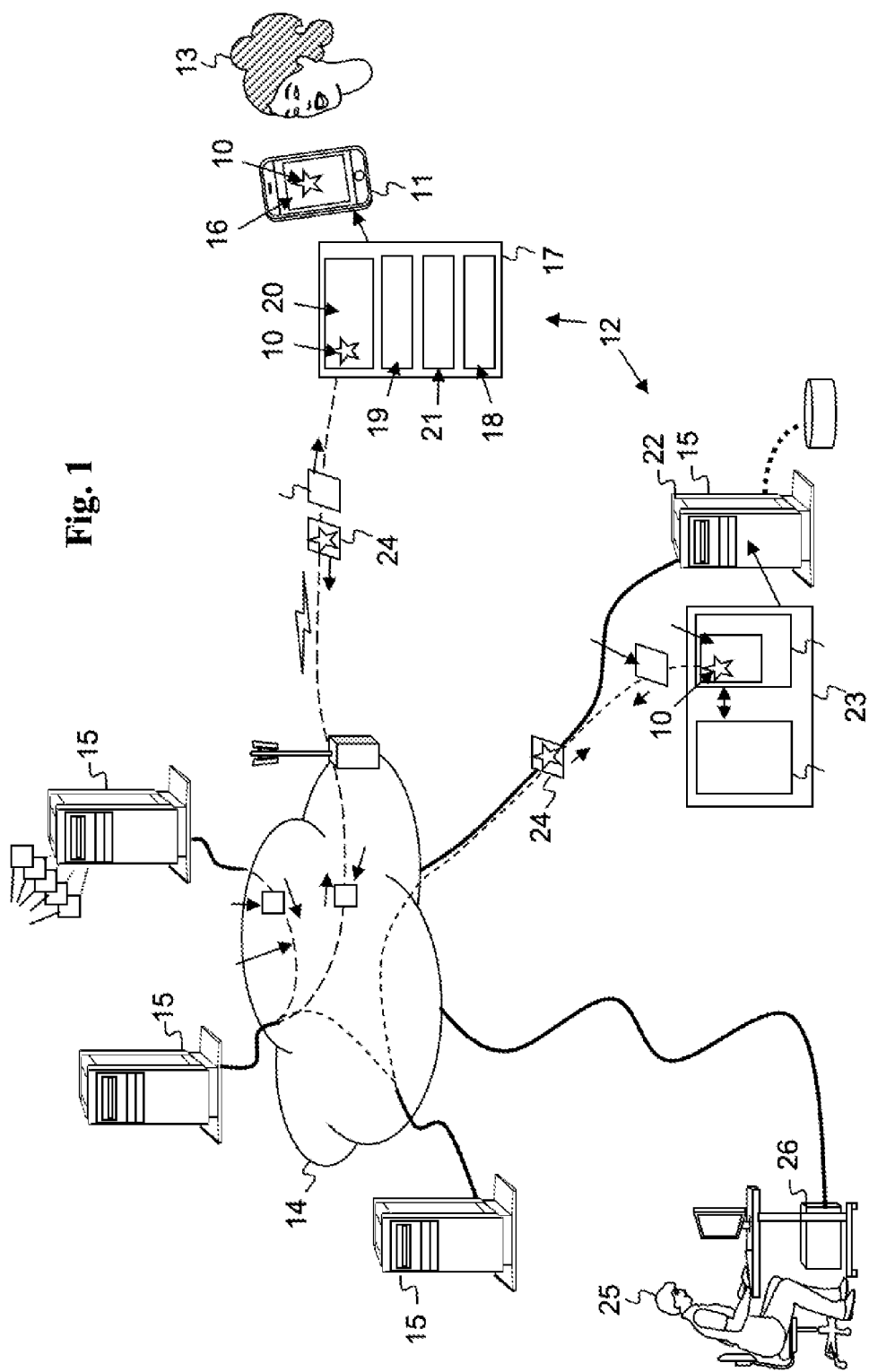
FIG. 1 is a simplified illustration of is a simplified illustration of a visual object displayed by a computational device and surveyed by a surveying system.

The principles and operation of a method and a system for surveying graphical objects on a screen display according to some embodiments may be better understood with reference to the drawings and accompanying description.

Before explaining at least one embodiment in detail, it is to be understood that the embodiments are not limited in its application to the details of construction and the arrangement of the components set forth in the following description or illustrated in the drawings. Other embodiments may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different drawings may use different scales and different scales can be used even within the same drawing, for example different scales for different views of the same object or different scales for the two adjacent objects.

The present embodiments comprise a method and a system for surveying graphical objects displayed on a screen display of a computational device. The term 'survey' may refer to actions such as search, detect, identify, copy, collect, crop, store, communicate, and analyze any type of graphical objects and/or images being displayed on a screen display of a computational device.

In this document the term 'computing device' may refer to any type of computing machine, including but not limited to, a computer, a portable computer (e.g. a laptop computer), a mobile communication device, a network server, etc., and any combination thereof. The term 'mobile communication device" may refer to devices such as a tablet, a mobile telephone, a smartphone, etc. Such computing device or computing machine may include any type or combination of devices, including, but not limited to, a processing device, a memory device, a storage device, and/or a communication device. The term 'mobile computing device' or 'mobile device' may refer to any type of mobile or portable computing machine such as a laptop computer, a tablet, a mobile telephone, and particularly a smartphone.

The term 'communication network' or 'network' may refer to any type or technology for digital communication including, but not limited to, the Internet, WAN, LAN, MAN, PSDN, wireless networking technology such as PLMN, cellular network, WiMAX, WLAN (Wi-Fi), WPAN (Bluetooth), etc. The term 'communication network' or 'network' may refer to any combination of communication technology, and to any combination of physical networks. The term 'communication network' or 'network' may refer to any number of interconnected communication networks that may be operated by one or many network operators.

The term 'application' may refer to a software program running on, or executed by, one or more processors of a computing devices, and particularly by a mobile computing device such as a mobile telephone, a tablet, a smartphone, etc., as well as any other mobile or portable computing facility. The term 'mobile application' may refer to an application executed by a mobile computing device.

The terms 'clickstream', 'clickpath', 'clickstream data', 'clickpath data', may include all the data that is provided to a user of a computerized device via any of the outputs of the device, as well as all the data that is collected from the user of a computerized device via any of the inputs of the device.

The terms 'visual', 'visual object', 'graphical object', and 'mage' may refer to any type of output data presented to the user on a screen display of the computerized device. Such visual data may include text, logo, symbols of any kind and shape, as well as images, such as pictures, video streams, etc.

The terms 'type', 'class' and 'characteristic' may refer to any kind of parameter, or a parameter value, or a range of values of a particular parameter, that may be common to a plurality of 'visuals', 'visual objects', 'graphical objects', etc.

The term 'advertising' or 'advertisement' may refer to content provided by a third party to a user of an application. An advertisement may be provided to the user in any sensible form such as sound, text, image, video, etc., and combinations thereof. In this sense, for example, the advertisement is provided to the user by the application within the application's screen display, or soundtrack, or any similar medium used by the application.

The term 'advertisement placeholder' (or ad placeholder) may refer to a place within an application, and particularly to an area within a screen display of an application, that may receive an advertisement, or in which an advertisement may be placed. An 'advertisement placeholder' may be associated with, or include, a bidding code.

The term 'bidding code' may refer to a software program that may be associated, for example, with an advertisement placeholder, and may communicate with an advertisement agent to enable advertisers to bid for the advertising place and communicate an advertisement to be displayed to the user.

One of the purposes of various embodiments is to survey, collect, correlate, index, and provide information associated with visual objects displayed to a user of a computerized device. The information may include any type of visual displayed to the user. The embodiments may also provide statistics and correlations associated with the information surveyed and collected. The embodiments may also provide a method and a system for executing such survey and providing the necessary information.

It is appreciated that the survey may include a large number of users using various computational devices, operating a large variety of applications, including mobile applications, visiting a large variety of websites, and receiving a large variety of advertisements.

A goal of the survey is to study and analyze how a particular graphical object may appear on the screen in various different situations, depending on the particular user, user location, the type of the computational device, the type of the screen display, the website visited, the application used, etc.

While the survey involves users using their respective computerized devices, as well as various software application executed by the respective computerized devices, the user using the computerized devices or software application is not required to perform any operation of the survey itself. The survey is executed by the respective computerized devices in the background without the user being requested to make any entries or decisions as part of the survey operations.

It should be appreciated that the present invention, and the various embodiments of the present invention, is a pioneering invention that can be applied in a wide variety of settings to accomplish a wide range of functionality. As such, the embodiments and the examples provide herein are presented to allow the reader to gain an overall understanding of the invention and embodiments thereof and should not be construed as limitations of the invention. For instance, one objective of the various embodiments is to identify, estimate, verify, etc. presentments or exposures of a particular advertisement. Further, embodiments may also include the aspect of analyzing not just how many, and the demographics of where the advertisements are exposed, but also how the advertisement appears on the display and the visual environment of the advertisement (e.g., other content and advertisements displayed to the user within the immediate session). The clickstream data may beneficially indicate that the advertisement is presented on a screen, but alone, it cannot identify how the advertisement is displayed and what the visual environment of the advertisement is (i.e., what was actually displayed to the user).

It should be appreciated that in some situations, items may be presented on a display screen that is small, or not sufficiently large enough to present all of the visual objects of something to be displayed, such as an advertisement. As such, the screen may only display parts or portions of an advertisement, or object that is to be displayed. In such situations, the ability to recognize the displayed image is much more difficult. In some cases, to identify the object that is intended to be displayed requires assembling a puzzle (i.e., of a panoramic view of multiple pieces of the object). Further, in some cases such activity may require remote image processing. Puzzle-processing requires collecting detailed image parameters, as it is not known what part of the image may captured in any particular screen-shot, and how to relate image parts to one another.

It is further important to understand that in some circumstance, objects presented on a display may have some level of motion or animation associated with the object. For instance, in an advertisement, a particular object may be animated to help draw attention. As such, displayed objects may have motion (e.g., image (e.g., video) or graphics (e.g., vector graphics)). In such situations, the afore-described puzzle-processing may thus also have a temporal aspect (not just spatial). Embodiments of the present invention advantageously allow the identify of how much and what part of the objects have been actually displayed and viewed by the user. To answer this question, it may be necessary to determine in advance the rate of capturing screen shots, which is obviously image/advertisement dependent as one (or more) of the detailed image parameters.

It should also be appreciated that in some cases, there may be images actually captured that may not be recognized (or that have been failed to be recognize) in the clickstream data, but that were recognized in the stream of screen-shots (due to the detailed image parameters).

Advantageously, in various embodiments of the present invention, the knowledge gathered by each client processing software (e.g, detailed image parameters) can be distributed to other client processing systems. Such knowledge may include and associate parameters to be identified in the clickstream data and the imaging details to be recognized in the captured screen-shots by the image recognition software.

As such, one process is to analyze the clickstream data to know what to look for, and then to analyze the "stream of data between the second software program and a screen display" to know when and how (rate) to capture what, then capturing a (sequence of) screen-shot(s) of the display, the captured image(s) are analyzed to determine how the objects or advertisement(s) is/are actually displayed and its/their visual environment (which may require puzzle-processing), and then the embodiments may present/store/distribute the analysis results.

It should be appreciated that while the various embodiments are described within the context of analyzing and tracking advertisements, the various embodiments and variations thereof can be utilized in many environments in which it is desirous for a machine to be able to identify, monitory, detect, ascertain and otherwise interpret what is displayed on a screen, including text as well as objects/graphics/video etc. As a non-limiting example, embodiments could be established to assess what is presented on a display for a reCAPTCHA authentication. Embodiments of the invention may be utilized identify what is displayed and then to generate a response to the "I am not a robot" challenge. Further, embodiments of the invention may be utilized to assist the blind in identifying what may be presented on a display screen. Embodiments of the invention may also be used to monitor the display output of control systems to identify if and when a malfunction takes place. The reader will appreciate that these and many other implementations of the various aspects of the present invention can be utilized and the present invention is not limited to those applications, functions and embodiments presented herein.

Reference is now made to FIG. 1, which is a simplified illustration of a visual object 10 displayed by a computational device 11 and surveyed by a surveying system 12, according to one embodiment.

FIG. 1 shows a first user 13 using computational device 11. The computational device 11 may be communicatively coupled to a communication network 14. The computational device 11 may be communicatively coupled via communication network 14 to a variety of network servers 15.

FIG. 1 shows computational device 11, for example, as a mobile telephone or a smartphone. However, computational device 11 may be any type of computer, including a tablet, a laptop computer, a desktop computer, etc.

Computational device 11 may include a user interface for interacting with user 13. Such user interface may include various input and output devices for presenting content to user 13, and/or for receiving content from user 13, or under the control of user 13. Output device may include various types of devices for presenting visual content to user 13, such as a screen display 16.

Computational device 11 may also include a processor (not shown in FIG. 1) that may execute one or more software programs 17, which may include an operating system 18, and one or more applications 19 typically running over operating system 18. Application 19 may present content 20 to user 13 of computational device 11, and particularly display visual content on the screen display 16 of computational device 11. Such visual content may include one or more visual objects 10.

It is appreciated that content 20 may include any type and combination of sensory content such as image, sound, text, etc., presented to user 13. The term 'present' may refer to any means of providing content to a human including, but not limited to a screen display, a speaker, an earphone, etc. Content 20 may include content selected by user 13 as well as content 20 selected by other computational devices, such as advertisements.

Computational device 11 may also include a client surveying software program 21, which may be part of the surveying system 12. In other words, surveying system 12 may include surveying software program being installed in computational device 11 and executed by a processor of computational device 11.

As shown in FIG. 1, survey system 12 may also include one or more surveying servers 22 communicatively coupled to communication network 14. Surveying server 22 may include a processor (not shown in FIG. 1) that may execute a server surveying software program (e.g., server software) 23.

As shown in FIG. 1, survey system 12 may detect and collect one or more visual objects 10. For example surveying software 21 may detect one or more visual objects 10, and communicate to server software 23, for example via communications 24, the one or more visual objects 10 and/or one or more parameters associated with the one or more visual objects 10. Server software 23 may then collect, index, store, and analyze the one or more visual objects 10 and/or one or more parameters associated with the one or more visual objects 10.

A user 25 may then obtain the results of the survey, for example via a user interface, for example by using a terminal 26 or a similar computational device which may be communicatively coupled to the one or more surveying servers 22.

Figure 2:
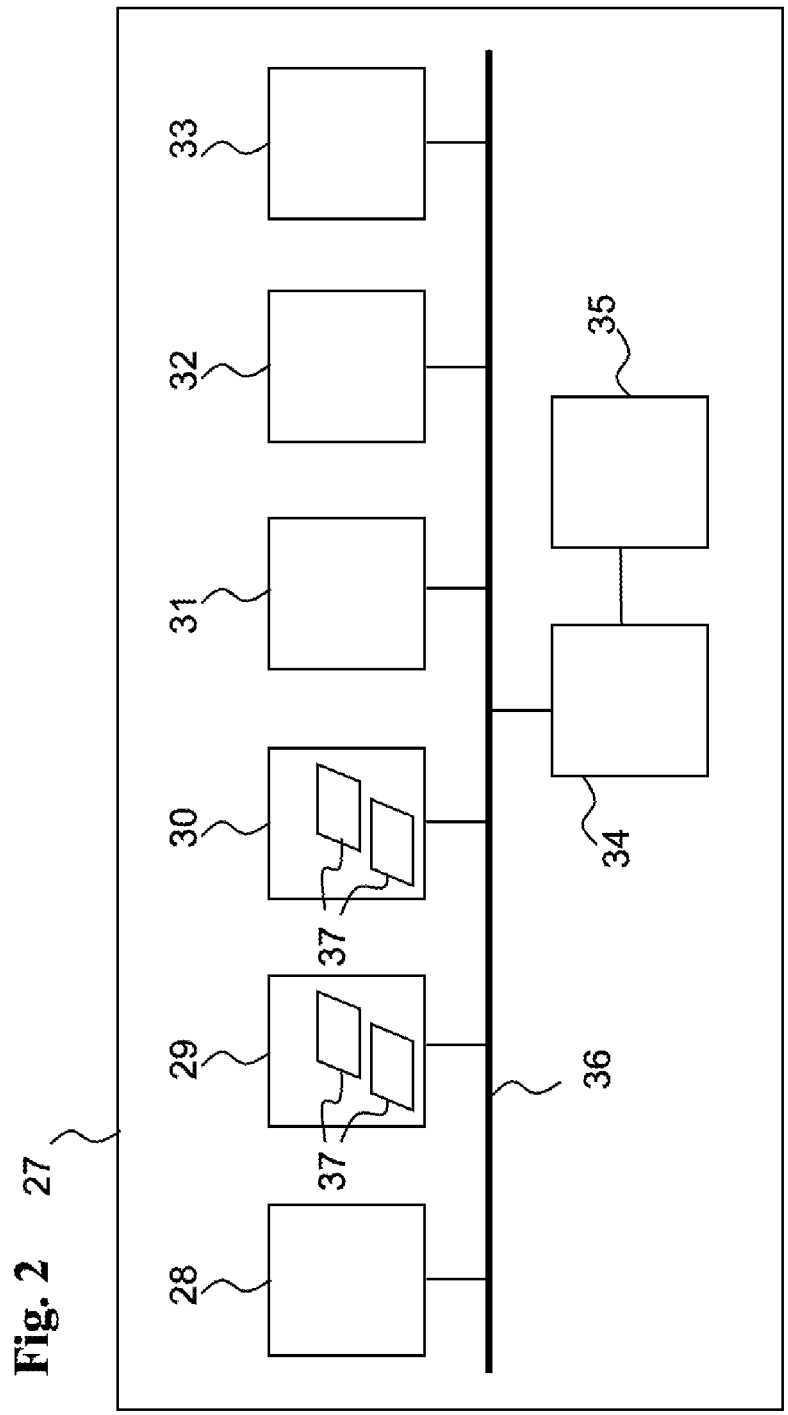
FIG. 2 is a simplified block diagram of a computing device such as used for the computational device and/or the surveying system.

Reference is now made to FIG. 2, which is a simplified block diagram of computing device 27, according to one embodiment.

As an option, the block diagram of computing device 27 of FIG. 2 may be viewed in the context of the details of the previous Figures. Of course, however, the block diagram of computing device 27 of FIG. 2 may be viewed in the context of any desired environment. Further, the aforementioned definitions may equally apply to the description below.

It is appreciated that computational device 11, and/or network server 15, may be embodied as one or more computing devices 27. Computing devices 27 can therefore represent a smartphone, a tablet, a laptop computer, a desktop computer, a network server 15, or a part of a network server 15, or a plurality of network servers 15, or a data-center, including cloud-based computing infrastructure.

In this respect, survey system 12 may be embodied using one or more computing devices 27. Computing device 27 may therefore be operative to provide computing infrastructure and resources for any type and/or instance of software component executed within survey system 12. In this regard computing device 27 is operative to process any of the processes described herein.

As shown in FIG. 2, computing device 27 may include the following components:

At least one processor unit 28 operative to execute one or more software programs as disclosed with reference to FIG. 1.

One or more memory units 29, e.g. random-access memory (RAM), a non-volatile memory such as a Flash memory, etc., operative to store software programs, parameters, data, databases, digital content, etc.

One or more storage units 30 including, for example, a hard disk drive and/or a removable storage drive, representing a floppy disk drive, a magnetic tape drive, a compact disk drive, Flash drive, etc. The removable storage drive reads from and/or writes to a removable storage unit in a well-known manner. The storage units being operative to store software programs, parameters, data, databases, digital content, etc.

One or more communication units 31 operative to communicatively couple computing device 27 to at least one communication network 14 as disclosed herein and in FIG. 1.

One or more graphic processors 32 and displays 33 operative to enable a user to operate and control computing device 27 and software programs executed by computing device 27.

A power supply 34 and power source 35, such as a battery, for example, if computing device 27 is a mobile, and/or portable, computing device.

One or more communication buses 36 connecting the above units.

One or more computer programs 37, or computer control logic algorithms, which may be stored in any of the memory units 29 and/or storage units 30. Such computer programs, when executed, enable computing device 27 to perform various functions (set forth herein, for example). Memory units 29 and/or storage units 30 and/or any other storage are possible examples of tangible computer-readable media.

It is appreciated that any software program of FIG. 1 may be embodied as a computer program 37 of FIG. 2. For example, operating systems, applications 19, software program 17, operating system 18, applications 19, server software 23, and/or surveying software program 21.

Returning to FIG. 1, computational device 11 may use operating system 18, which may provide applications 19 with programming tools to display content on the screen display. Such tools may be known as system calls, and/or application programming interface (API), etc. Operating system 18 may also provide similar tools to monitor content displayed on the screen display. Surveying software program 21 may use such system calls, and/or API, of operating system 18 to retrieve content displayed on the screen display, including graphical objects. These tools (OS-API) may provide content displayed on the screen display as computer-readable data.

Alternatively, and/or additionally, some applications 19, such as browser applications, may also provide such with programming tools, e.g., API, for other programs, to monitor content that the particular application 19 displays on the screen display. Surveying software program 21 may use such API, of an application 19, to retrieve content displayed on the screen display, including graphical objects. These tools (Application-API) may provide content displayed on the screen display as computer-readable data.

Alternatively, and/or additionally, operating system 18 may also provide a tool, or a system call, or an API, to obtain a screen-shot of the screen display, for example, in the form of 'print-screen'. Such screen-shot tool may provide an instantaneous image of the entire screen. The image may not be computer-readable data and may require tools such as optical character recognition (OCR), object recognition, etc.

Image analysis and recognition software tools such as optical character recognition (OCR), object recognition, etc., may require relatively higher processing power to analyze a screen-shot than software tools that analyze machine-readable data. Therefore, surveying system 12 may divide the processing between the surveying software 21 executed by computational device 11, and server software 23 executed by a server 15, according to the available resources.

Surveying system 12 may consider resources such as available processing power (for example, of processor unit 28 of FIG. 2), available memory or storage (for example, of memory 29 or storage 30 of FIG. 2), available electric power, for example from battery 35 of FIG. 2, communication bandwidth (for example, of communication unit 31 of FIG. 2).

It is appreciated that executing image analysis and recognition software tools such as optical character recognition (OCR), object recognition, etc., may consume electric power and drain the battery of a mobile device. However, communicating large amount of data, such as frequent screen-shots, may also consume battery power and load the communication bandwidth.

Hence, surveying system 12 may consider the current availability of the various resources and determine the recognition technology to be used, as well as where each recognition technology should be executed, namely, surveying software 21 executed by computational device 11, and server software 23 executed by a server 15.

Figure 3:
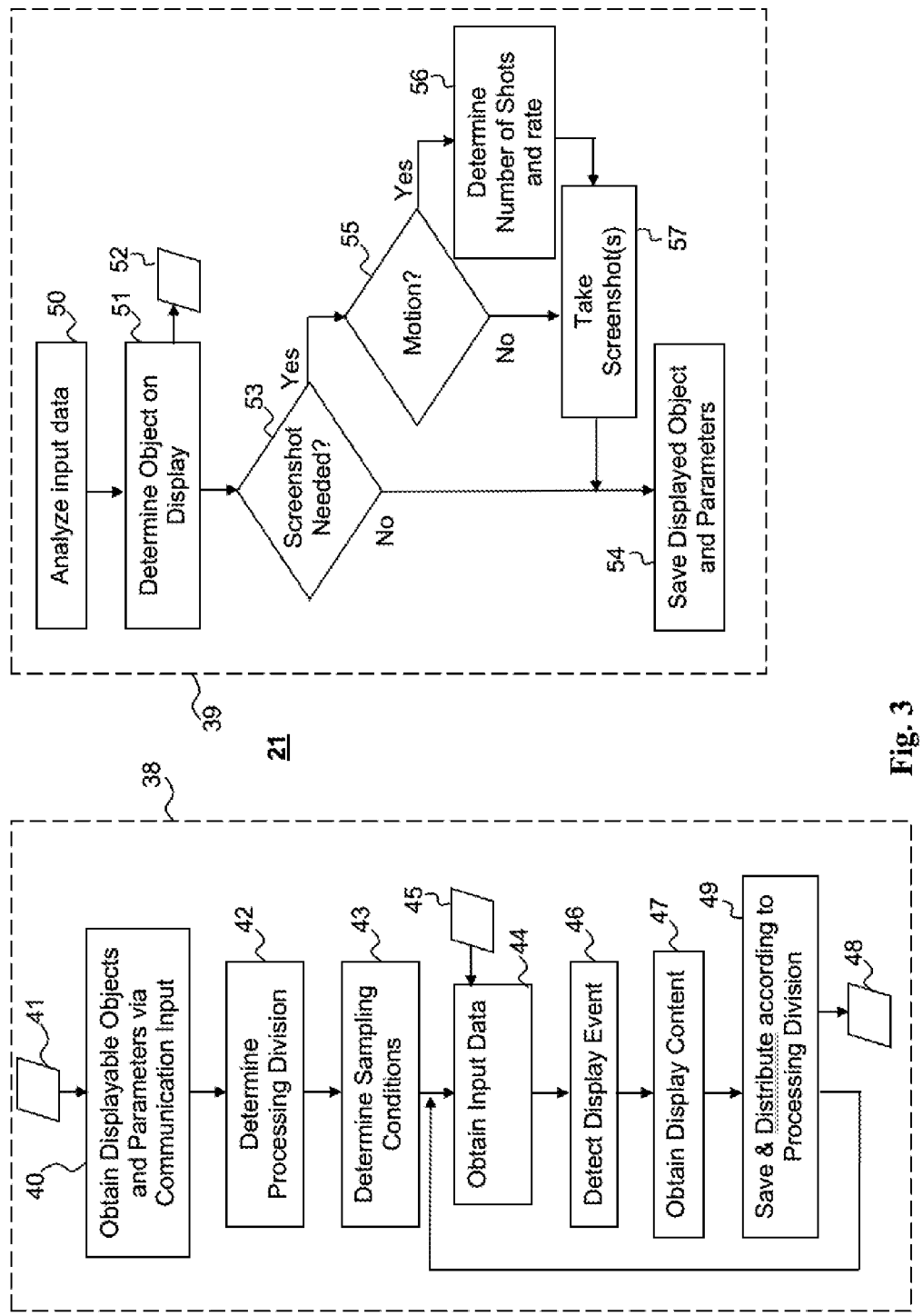
FIG. 3 is a block diagram of surveying software program that may be executed by a terminal computational device, such as a mobile device, such as a smartphone.

Reference is now made to FIG. 3, which is a block diagram of surveying software program 21, according to one exemplary embodiment.

As an option, the block diagram of FIG. 3 may be viewed in the context of the details of the previous Figures. Of course, however, the block diagram of FIG. 3 may be viewed in the context of any desired environment. Further, the aforementioned definitions may equally apply to the description below.

As shown in FIG. 1, surveying software program 21 may be installed on a terminal computational device 11, which may be a mobile device such as a smartphone. As shown in FIG. 3, surveying software program 21 may include a main routine 38, and a subroutine 39.

Main routine 38 may start with action 40 by receiving a list 41 of one or more graphical objects to be recognized, collected, saved, and communicated (e.g., to server software 23). Such objects may include, for example, a visual object 10 as shown and described with reference to FIG. 1.

List 41 may include whole graphical objects, one or more parts of one or more graphical objects, and parameters of the graphical objects. Action 40 may obtain list 41, for example, from a server 15, such as a surveying server 22 and/or server software 23.

Object parameters, as may be provided in list 41, may indicate a shape of the object, a size of the objects, a color of the object, one or more letters associated with the object, a universal resource locator (URL), etc. The term URL may refer to any internet address, or link (to a web address or to a local document, bookmark, etc.), or identifier of any type of resource or content.

For example, action 40 may obtain list 41 upon accessing a particular content item such as a particular website and/or a particular webpage, etc. Such list 41 may be associated with the particular content item, and/or the type, and/or subject, and/or category, and/or characteristic, of the particular content item.

For example, action 40 may analyze the content item and may determine one or more characteristics of the content item. For example, action 40 may associate the content item with a particular market, and/or industry, and/or a product type, and/or entertainment activity, and/or social environment, etc. Each such subject, and/or type, and/or characteristic, may be associated with a particular list 41.

Hence, upon accessing a particular content item action 40 may determine the type, and/or subject, and/or characteristic of the content item and communicate to surveying server 22 and/or server software 23 a request for a list 41 that is associated with the particular type, and/or subject, and/or characteristic of the currently accessed content item.

It is appreciated that main routine 38 may obtain, store, and maintain one or more lists 41. For example, as main routine 38 proceeds from one webpage to another, main routine 38 may obtain (via action 40) and maintain a plurality of lists 41. For example, main routine 38 may first receive a list 41 including general and/or more common graphical objects that are associated with a broader range of the particular type, and/or subject, and/or characteristic of the currently accessed content item. Thereafter, as main routine 38 proceeds to deeper webpages, main routine 38 may receive lists 41 including graphical objects that are associated with a narrower type, and/or subject, and/or characteristic of the newly accessed content item.

Main routine 38 may then proceed to action 42 to determine processing division for various graphical objects of list 41, as may be needed. The processing division may determine what should be done by surveying software program 21, and what should be done by surveying server 22 and/or server software 23. The processing division may refer to actions such as sampling the graphical object, analyzing the graphical object, identifying the graphical object, etc.

For example, list 41 may indicate which graphical object should be processed and/or recognized by the client surveying software 21, and/or which graphical object should be processed and/or recognized by the server software 23.

For example, when main routine 38 maintains a plurality of lists 41, surveying software program 21 and/or server software 23 may indicate which list 41 should be processed and/or recognized by the client surveying software 21, and/or which list 41 should be processed and/or recognized by the server software 23. Main routine 38 may then proceed to action 43 to determine sampling conditions for various graphical objects of list 41, as may be needed. Sampling condition may determine a particular type of data, and/or a particular value of data, that may form a display event that may trigger sampling of a corresponding graphical object.

For example, sampling condition may determine if a screen shot is required, and/or how many screen shots are required, and/or the rate at which screen shots should be sampled, etc.

In this respect, main routine 38 may obtain a screenshot of the screen and then subroutine 39 may crop the image in the backend server using image recognition. Therefore, main routine 38 may determine in real time which images should be captured and which should not. Main routine 38 may then determine in real time which of the captured images should be cropped by main routine 38 and which of the captured images should be cropped by subroutine 39 and/or the server. Main routine 38 may also determine in real time the metadata (parameters) for each screenshot and/or object and/or image to determine if it is relevant (for example according to list 41). Main routine 38 may then communicate to subroutine 39 and/or the server such metadata.

Main routine 38 may then proceed to action 44 to collect input data 45. Input data 45 may include the stream of data exchanged with any internet entity such as a website or a web page, clickstream data, clickpath data, bidding code information, advertisement, etc.

Input data 45 may also include page source data, which may be obtained by action 44, for example, via an application programming interface (API) of a browser or a similar software program executed by computational device 11, such as application 19 of FIG. 1.

Input data 45 may also include content such as content 20 presented to user 13 by application 19. For example, some of content 20 may be generated internally by application 19, rather than received from an external source. Such displayable content 20 may be obtained by action 44, for example, via an application programming interface (API) of operating system 18 of computational device 11 of FIG. 1.

Main routine 38 may then proceed to action 46 to analyze input 45 so as to detect one or more display events, which may require sampling of data associated with graphical and/or visual objects displayed to user 13 on screen display 16 of computational device 11 of FIG. 1. A display event may be determined, for example, based on one or more sampling conditions determined in action 43, which may be based on parameters receive by action 40 via list 41. Main routine 38 may then proceed to action 47 to collect display content, as determined in action 46 to form sampled content 48.

A display event may be determined by analyzing content and/or data included in input data 45. For example, such content and/or data may include image caption text, and/or iframe, and/or JavaScript container, that may include the size and/or description of the associated object. Such content and/or data may also include an image URL, which action 46 may read and analyze to determine of the text includes a description or identification of the object. Action 46 may also read and analyze the HTML content included in input data 45. Such data as the content of the URL text, caption text, iframe, JavaScript, and/or HTML data may be compared to data of the list 41 to determine if the associated object is of interest and should be processed as detail herein.

Main routine 38 may then proceed to action 49 to save and process sampled content 48 and/or to communicate sampled content 48 or any part thereof to one or more surveying servers 22, as may have been determined by action 42. Actions 44, 46, 47, and 49 may be repeated, or executed continuously, for example, as long as actions 44 may obtain new input data 45.

Subroutine 39 may represent an exemplary embodiment of action 47 of main routine 38. Namely, action 47 is implemented in further details by subroutine 39. Subroutine 39 may start with action 50 by analyzing input data 45 to recognize data representing a graphical object according to the listed objects of list 41 and their associated parameters.

As described above, the analysis executed by action 50 may be subject to the particular list 41 obtained for the content item currently accessed. If main routine 38 maintains a plurality of lists 41, action 50 may start with the most recent list 41. If no object is recognized according to the current list 41, then action 50 may use a previously obtained list 41. For example, action 50 may use lists 41 in reverse order of receiving lists 41. Other algorithms for selecting a list 41 from the plurality of lists 41 are contemplated.

It is appreciated that operating system 18, and/or application 19, may modify the displayed content 20 to fit to the parameters of the screen display. For example, considering the size of the screen display, the size of a window within the screen display, the number of pixels available for display, the aspect ratio and/or orientation of the screen display, minimum character size, etc. Therefore, the actual relation between various components of the displayed content 20 may differ from one screen display to another, or according to the instant situation. Such the actual relation between various components of the displayed content 20 may refer to differences in relative size and/or differences in relative location. For example, an image may be partially displayed.

Subroutine 39 may then proceed to action 51 to determine display parameters 52 of the one or more objects detected in action 50. Display parameters 52 may represent when, where, and how the particular object is displayed to user 13 on screen display 16 of computational device 11 of FIG. 1. Display parameters 52 may then be included in sampled content 48 communicated to one or more surveying servers 22.

It is appreciated that action 47, and/or subroutine 39, may obtain, or sample, or collect, or crop, an image of the displayed object. The terms 'obtain', 'sample', 'collect" and 'crop', may be used herein interchangeably, to denote how action 47, and/or subroutine 39, may obtain an image of an object as the object is displayed to a user of the display.

It is appreciated that action 47, and/or subroutine 39, may have to obtain a complete image of the displayed object. Hence, action 47, and/or subroutine 39, may know in advance at least some property, or feature, of the sampled object being displayed, where this property, or feature, may be used to verify that the displayed object is sampled, or cropped, completely.

For example, such image property, or feature, that verifies completeness, may by a graphic property associated with chromaticity, line effect, edge effect, etc., as well as combinations thereof. For example, the property, or feature, of completeness may be associated with color, such as monochrome color, such as white or black that may surround the image and may be used to verify completeness of sampling (cropping).

For example, the property, or feature, of completeness may be associated with a line, or edge, or contour, such as square, or round, or oval, etc., that may surround the image and may be used to verify completeness of sampling (cropping).

Such property, or feature, that may verify completeness of sampling, may be provided as a display parameter provided as part of list 41. Such property, or feature, that was used to verify the completeness of the sampling may then be provided as a display parameter 52. It is therefore appreciated that to obtain a complete image of a particular object, more than one screenshot may be required. Therefore, action 47, and/or subroutine 39, may determine, for example based on data provided as part of list 41, how to execute a plurality of screenshots to obtain a complete image of a particular object.

To obtain such plurality of screenshots and to obtain a complete image of a particular object, action 47, and/or subroutine 39, may, for example, monitor the activity of the user and obtain screenshots as further parts of the required image are being displayed.

For example, regarding when the particular object is displayed, action 51 may determine the time in which the display of the particular object has started, and the length of time the particular object has been displayed. Such temporal data may be included as object parameters in display parameters 52.

For example, regarding where the particular object is displayed, action 51 may determine the place on the screen display where the particular object has been displayed. For example, in terms of pixels from the upper left corner of the screen display. For example, action 51 may determine the size of the particular object on the display. For example, in terms of area, for example as a number of pixels, or as a length of a diagonal between the upper left corner and the bottom right corner of the displayed object. Such spatial data may be included as object parameters in display parameters 52.

For example, regarding how the particular object is displayed, action 51 may determine the mode in which the particular object appears on the display. For example, in terms inclusion, and/or pop-up (window or frame), hover over any other displayed content, etc. For example, action 51 may determine that only part of the object is being displayed. Such data may be included as object parameters in display parameters 52 as display mode data.

For example, action 51 may also include in display parameters 52 the data used to initiate the sampling of the particular object, such as data from list 41 that defined the particular objects, and/or data from input data 45 that may have triggered the display event (see action 46) that has triggered the capture of the image of the particular object, etc.

Subroutine 39 may then proceed to action 53 to determine if a screen-shot is required. If a screen-shot is not required, subroutine 39 may proceed to action 54 to save the sampled data of the visual object and the associated parameters as may have been determined from list 41, and/or collected from input data 45, and/or analyzed with reference to display parameters 52.

If a screen-shot is required, subroutine 39 may proceed to action 55 to determine if the sampled object is a motion graphic, and/or animated graphic, and/or video clip, or any other type of visual data that may be changing with time. If the sampled object is a motion graphic, subroutine 39 may proceed to action 56 to determine the rate at which the screen shots should be obtained and the number of screen-shots to be sampled, and/or the time period for sampling the motion graphic object.

Subroutine 39 may then proceed to action 57 to take the screenshots of screen display 16 of computational device 11 of FIG. 1 as determined in action 56, and then to action 54 to save the screen shots with their associated parameters as described above (including display parameters 52). The screen shots and their associated parameters may then be included in sampled content 48 communicated to one or more surveying servers 22.

It is appreciated that in some cases the area of the visual content provided for display is larger than the area of the particular screen display of the particular computational device 11. In such case not all the visual content is displayed to the user at once. For example, computational device 11 may enable the user to roll, and/or pan, and/to shrink the visual content, and/or otherwise manually scan the visual content on the screen display.

In such situations, where, for example, there is no exact match between the size and/or or area, and/or aspect ratio, and/or any spatial dimension of the visual content and the size, and/or area, and/or aspect ratio, and/or any spatial dimension of the screen display, the actual location, and/or position, and or size, of the particular graphical object, as actually displayed on the screen display, may vary, for example, based on the user activity.

It is appreciated that the term 'aspect ratio' may also refer to the orientation of the screen display, such as the positioning of the screen display in profile (vertically) or landscape (horizontally) positions.

Hence, in such situations, where, for example, there is no exact match between the size and/or or area, and/or aspect ratio, and/or any spatial dimension of the visual content and the size, and/or area, and/or aspect ratio, and/or any spatial dimension of the screen display, there may be possible differences between the parameters of the particular visual objects as received via list 41, the parameters of the particular visual objects as received via input 45, and the parameters of the particular visual objects as sampled and provided as display parameters 52.

Hence, in such situations, where, for example, there is no exact match between the size and/or or area, and/or aspect ratio, and/or any spatial dimension of the visual content and the size, and/or area, and/or aspect ratio, and/or any spatial dimension of the screen display, a visual and/or graphical object may be partially displayed, and/or partially viewed. For example, only a part of the visual and/or graphical object may be sampled in a screenshot.

Figure 4:
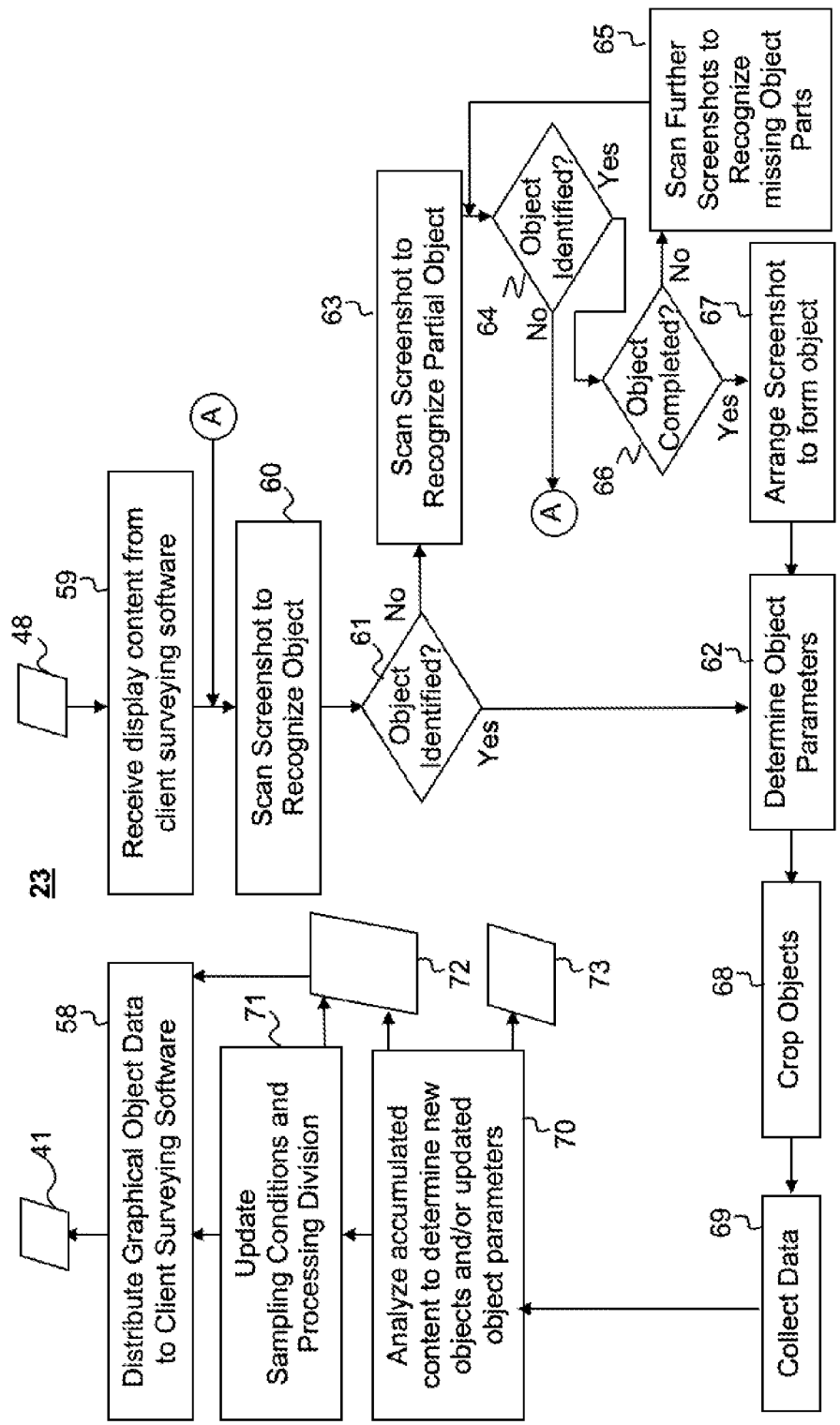
FIG. 4 is a block diagram of surveying software program that may be executed by one or more surveying servers.

Reference is now made to FIG. 4, which is a block diagram of surveying software program 23 that may be executed by one or more surveying servers 22, according to one exemplary embodiment.

As an option, the block diagram of FIG. 4 may be viewed in the context of the details of the previous Figures. Of course, however, the block diagram of FIG. 4 may be viewed in the context of any desired environment. Further, the aforementioned definitions may equally apply to the description below.

As shown in FIG. 4, surveying software program 23 may start with action 58 by communicating lists 41 to one or more client surveying software 21 being executed on respective one or more computational devices 11. In parallel to action 58, surveying software program 23 may execute action 59, receiving sampled content 48 from various client surveying software 21. As described above, sampled content 48 may include display parameters 52.

It is appreciated that the same list 41 may be communicated to any number of client surveying software 21, and/or any number of different lists 41 may be communicated to any number of client surveying software 21.

Surveying software program 23 may then proceed to action 60 to process sampled content 48. For example, sampled content 48 may be scanned to recognize an object not recognized by client surveying software 21, for example, according to processing division instructions included, for example, in the associated list 41. If an object is identified (action 61), surveying software program 23 may proceed to action 62 to determine the object's parameters.

If an object is not identified, surveying software program 23 may proceed to action 63 to scan the screenshot (e.g., the image obtained and provided in sampled content 48) to recognize a part of an object (partial object).

If an object is identified by its part (action 64), surveying software program 23 may scan further screenshots (action 65) to recognize other parts of the same object, until all the parts of the object are scanned and identified and the object image is completed (action 66). Thereafter surveying software program 23 may proceed to action 67 to arrange the screenshots to form the object and to action 62 to determine the object's parameters. If an object is not identified by its part (action 64) then surveying software program 23 may continue to search for another object (action 60).

Surveying software program 23 may then proceed to action 68 to crop further objects, such as objects not listed in the current list 41, or even objects not listed in any list 41, and to action 69 to collect data associated with the objects of action 68.

Surveying software program 23 may then proceed to action 70 to analyze the accumulated content and to determine new objects and/or updated object parameters, and to action 71 to update the sampling conditions and the processing divisions. Such data (objects, object parameters, processing division, sampling conditions, etc.) may be collected and maintained in an objects database 72. Objects database 72 may then be used by action 58 to create one or more list 41, for example, based on the identification of the content item accessed by the user.

Action 70 may also maintain an occurrence database 73 including associations of occurrences of objects (of objects database 72), for example, representing threads of objects occurring in the same session for a particular user.

Reference is now made to FIG. 5, which is a simplified block diagram of a general process 74 for surveying graphical objects on a screen display, according to one embodiment.

As an option, the block diagram of general process 74 of FIG. 5 may be viewed in the context of the details of the previous Figures. Of course, however, the block diagram of general process 74 of FIG. 5 may be viewed in the context of any desired environment. Further, the aforementioned definitions may equally apply to the description below.

It is appreciated that general process 74 may include embodiments of either or both of surveying software 21 and server software 23 for performing the following actions. It is appreciated that the actions of general process 74 can be mapped into the actions of surveying software 21 and/or server software 23, or vice versa.

General process 74 may start with action 75 by identifying an object presented on the screen display of a computing equipment such as object 10 displayed on screen display 16 of computational device 11 of FIG. 1. For example, action 75 may identify objects by comparing with objects of objects database 72.

Action 76 may obtain (e.g., by a screenshot) the complete image (picture) of the object from the screen display, once completeness is validated. For example, the completeness can be validated by determining that sufficient white space (or non-image space) is present on all sides of the picture, which determines that the image is shown in its full form.

Once completeness is validated, action 77 may crop the relevant image from the screenshot taken based on a selected machine vision algorithm.

Action 78 may identify the object of the cropped image by machine vision and implementing (associating) a unique digital signature for the object of the cropped image. Action 78 may update and maintain the occurrences (threads) database 73.

Action 79 may search for, and identify a unique signature. The digital signature may be implemented as a process of analyzing the image digital binary, and searching for three-pixel-spots binaries, which comprise the image key. Such digital signature may be used as a watermark for binary files.

If the unique signature is within the applicable signatures repository of objects (action 80) that are of interest (e.g., as provided by a list 41), action 81 may operate to process the cropped image to extract other relevant text and URL data presented within the cropped image, or in the vicinity of the cropped image, or elsewhere on the same page as displayed with the cropped screenshot. Action 81 may also update objects database 72

For example, action 81 may scan the cropped image, or its vicinity, to extract relevant text, such as a brand name. Action 81 may use, for example, optical character recognition (OCR) to determine a caption, a logo, a brand name, etc., within the cropped image or its surrounding.

Action 82 may optionally analyze and determine, based on the extracted object image, and object parameters, including text, and URL data, as captured from the screen display, the occurrence of a particular advertisement, being displayed to the user on the screen display.

Action 83 may optionally associate the particular advertisement with any of the other objects identified to be displayed to the user on the screen display. Such associations of advertisements with objects (e.g., of objects database 72) and with threads (e.g., of occurrences database 73) may be maintained in an advertising database 84. In this respect, the general process 74 of FIG. 5 may be divided into the two (or more) processes. For example, general process 74 may be divided into the process of surveying software 21, typically executed by computational device 85 operated by user 13, as shown and described with reference to FIG. 3, and the process of server software 23, typically executed by (one or more) network server 15, as shown and described with reference to FIG. 4.

The purpose of the division general process 74 is to reduce the processing load on the processor of the computational device 86, and to reduce the communication load on the network connecting the computational device 87 and network server 15, by selecting, in real-time, the parts, or elements, or components, of the content displayed to user 13 on the display of computational device 88. Such selection is performed automatically based on object characterization data, such as list 41, provided in run-time by network server 15 to computational device 89.

Therefore, computational device 90 may screenshot the screen selectively and communicate the screenshot data to the network server 15. And the network server 15 may then crop the image, for example using image recognition. Network server 15 may then deduce image characterization and/or metadata and decide, in real time, if it is relevant. Network server 15 may then communicate to computational device 91 requests to retrieve (e.g., by screenshots) and communicate further elements of the displayed content.

The image analysis of the general process 74 of FIG. 5 is therefore divided, in real-time, between computational device 92 and network server 15, so that lightweight parts (non-processor intensive) of the analysis are performed by computational device 93, thus reducing communication load, and heavyweight parts (processor intensive) of the analysis are performed by network server 15, thus reducing processing load on computational device 94.

Lightweight parts of the analysis may include analyzing clickpath data, HTML content, available image metadata, image code, description text in caption, iframe and JavaScript wrappers, URL text and URL parameters, etc. Heavyweight parts of the analysis may include image recognition, OCR, identifying image elements such as logo, brand name, etc., digital signature analysis, etc., as well as identifying any particular advertisement displayed to user 13.

Thereafter, network server 15 may associate, and/or correlate, images in the stream of data or content received by computational device 95 as it is actually displayed to user 13, as well as associate, and/or correlate, displayed images and displayed advertisements. Such associations, and/or correlations, may then be used to improve the selections, and/or orientations, of display screenshots, image cropping, and image analysis.

The term orientation may refer to the location and timing of the screenshot, operating multiple screenshots to retrieve a complete image, division of the analysis, etc.

Advertisement analysis and association and/or correlation may include determining the advertiser, the brand name, the advertisement landing page (URL), etc. Some of the advertisement analysis may be executed by the network server 15, for example using image processing, and some of the advertisement analysis may be executed by the computational device 96, for example by analyzing clickpath data, image metadata, etc.

It is expected that during the life of this patent many relevant advertisement systems and applications will be developed and the scope of the terms herein, particularly of the terms "mobile device", "mobile application", "advertisement" or "mobile advertisement", "advertisement bidding", and "bidding agent" or "ad-network", is intended to include all such new technologies a priori.

Additional objects, advantages, and novel features of the embodiments described herein will become apparent to one ordinarily skilled in the art upon examination of the following examples, which are not intended to be limiting. Additionally, each of the various embodiments and aspects of embodiments as delineated hereinabove and as claimed in the claims section below finds experimental support in the following examples.

It is appreciated that certain features of the system and method described herein, which are, for clarity, described in the context of separate embodiments, may also be provided in combination in a single embodiment. Conversely, various features, which are, for brevity, described in the context of a single embodiment, may also be provided separately or in any suitable sub-combination.

Although the system and methods has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art.

What is claimed is:

1. A method for monitoring graphical content of a screen display, the method comprising:
receiving, by a software program executed by a processor of a computerized device communicatively coupled to a communication network, at least one parameter characterizing a graphical object;
monitoring a display of the computerized device, wherein the processor of the computerized device receives at least one advertisement via the communication network, wherein the processor displays the at least one advertisement on a display screen of the computerized device, wherein the monitoring uses the software program executed by the processor of the computerized device;
recognizing, by the software program executed by the processor of the computerized device, the at least one graphical object being displayed on the display screen;
collecting at least one of:
a parameter associated with the display screen; and
a parameter associated with other content displayed on the display screen substantially concurrently; and
identifying the other content associated with the parameter associated with a collected graphical object as an advertisement, wherein the graphical object and the advertisement are different entities.

2. The method according to claim 1, additionally comprising:
communicating to a server via the communication network at least one of:
the recognized graphical object; and
the at least one parameter.

3. The method according to claim 1, additionally comprising:
the at least one parameter being at least one of:
temporally associated with the recognized graphical object;
spatially associated with the recognized graphical object; and
a mode of display associated with the recognized graphical object.

4. The method according to claim 1, additionally comprising:
determining the least one graphical object to recognize to be at least one of motion graphics and motion image;

determining at least one of number of samples, rate of sampling, and period of sampling for recognizing the graphical object; and repeating the recognizing the graphical object according to the at least one of number of samples, rate of sampling, and period of sampling for capturing the graphical object.

5. The method according to claim 1, wherein the recognizable graphical object comprises at least two parts of the recognizable graphical object, wherein each of the at least two parts of the recognizable graphical object is associated with at least one parameter associated with at least one of:

the display screen; and other content displayed on the display screen substantially concurrently.

6. A computer program product embodied on a non-transitory computer readable medium comprising computer code for:

receiving, by a software program executed by a processor of a computerized device communicatively coupled to a communication network, at least one parameter characterizing a graphical object;

monitoring a display of the computerized device, wherein the processor of the computerized device receives at least one advertisement via the communication network, wherein the processor displays the at least one advertisement on a display screen of the computerized device, wherein the monitoring uses the software program executed by the processor of the computerized device;

recognizing, by software program executed by the processor of the computerized device, the at least one graphical object being displayed on the display screen;

collecting at least one parameter associated with at least one of:

the display screen; and other content displayed on the display screen substantially concurrently; and identifying the other content associated with the parameter associated with a collected graphical object as an advertisement, wherein the graphical object and the advertisement are different entities.

7. The computer program product according to claim 6, additionally comprising computer code for:

communicating the recognized graphical object to a server via the communication network.

8. The computer program product according to claim 6, additionally comprising computer code for:

collecting parameters associated with the recognized graphical object the parameters including at least one of:

temporal parameters associated with the capturing of the recognized graphical object;

spatial parameters associated with the recognized graphical object; and a mode of display associated with the recognized graphical object.

9. The computer program product according to claim 6, additionally comprising computer code for:

determining the least one graphical object to capture to be at least one of motion graphics and motion image;

determining at least one of number of samples, rate of sampling, and period of sampling for capturing the graphical object; and repeating the recognizing the graphical object according to the at least one of number of samples, rate of sampling, and period of sampling for capturing the graphical object.

10. The computer program product according to claim 6, wherein the recognizable graphical object comprises at least two parts of the recognizable graphical object, wherein each of the at least two parts of the recognizable graphical object is associated with at least one parameter associated with at least one of:

the display screen; and other content displayed on the display screen substantially concurrently.

* * * * *